June 17, 1924.

C. BOUIN 1,498,433

STEREOSCOPIC PROJECTION SCREEN

Filed Jan. 26, 1922　　2 Sheets-Sheet 1

INVENTOR=
Charles Bouin.

June 17, 1924.

C. BOUIN 1,498,433

STEREOSCOPIC PROJECTION SCREEN

Filed Jan. 26, 1922  2 Sheets-Sheet 2

INVENTOR=
Charles Bouin.

Patented June 17, 1924.

1,498,433

UNITED STATES PATENT OFFICE.

CHARLES BOUIN, OF BOSTON, MASSACHUSETTS.

STEREOSCOPIC PROJECTION SCREEN.

Application filed January 26, 1922. Serial No. 531,938.

*To all whom it may concern:*

Be it known that I, CHARLES BOUIN, a citizen of the United States, residing at Boston, in the county of Suffolk and State of Massachusetts, have invented certain new and useful Improvements in Stereoscopic Projection Screens, of which the following is a specification.

The object of this invention being to project ordinary moving picture film images upon a screen of certain specified construction and the results obtained upon viewing said images upon the screen constitutes an improvement.

The invention relates more particularly to a stereoscopic projection screen or, a screen upon which are projected pictures or series of pictures which have been photographed from a single point of direction or position, such pictures or images being projected from one point of direction and upon viewing the projected images on such a screen as to be described in detail, space, relief, solidity, etc., will be perceived.

Further objects and advantages of the present invention will be pointed out in the hereinafter following description of one embodiment hereof, or will be obvious to those skilled in the mentioned arts.

Figure 1:
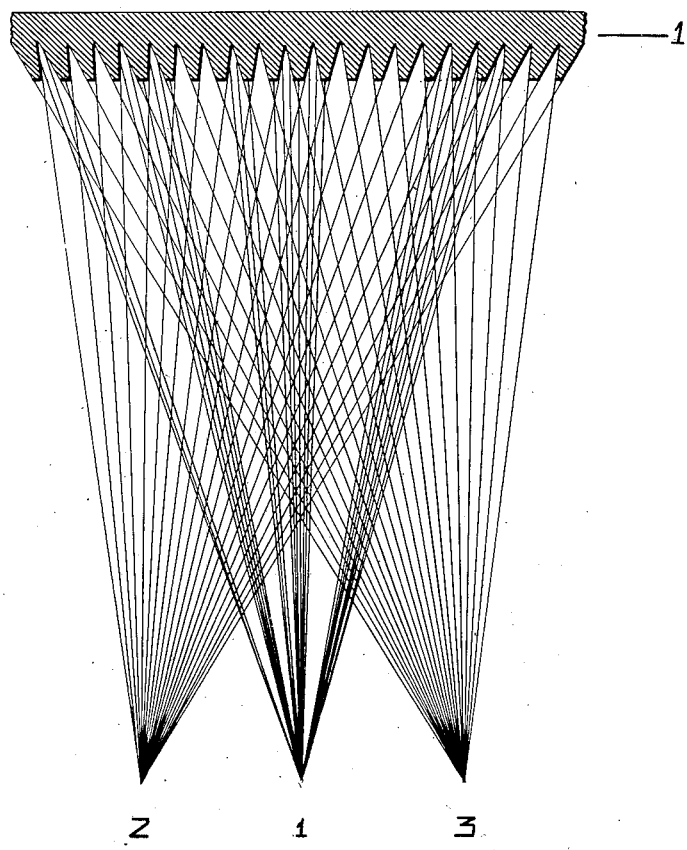
Figure 2:
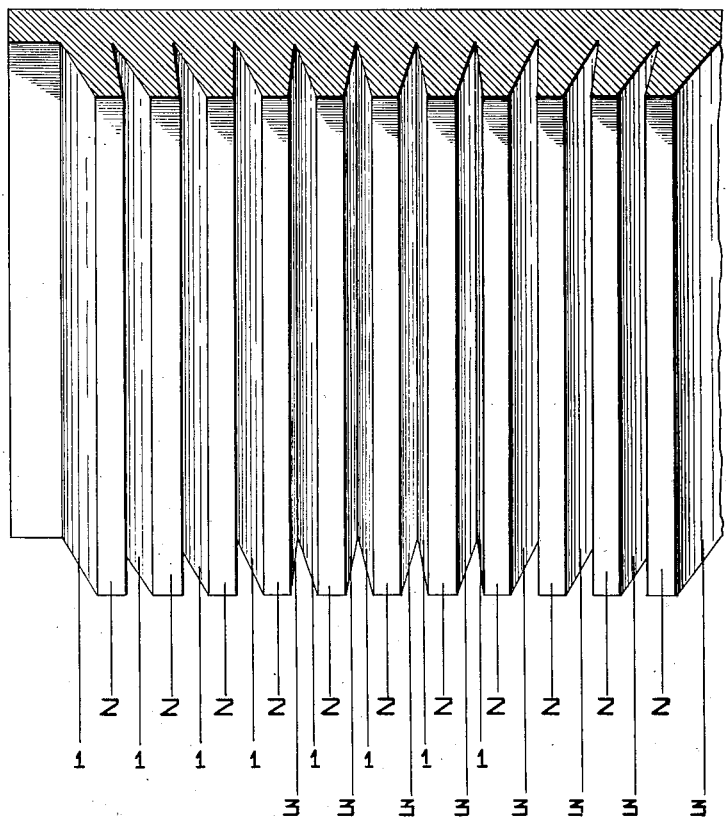

Figure 1 is a top edge view of a screen constructed according to this invention, and Figure 2 is a front view thereof.

Fig. 1, is intended to represent an idea of a stereoscopic projection screen which is composed of different frustrum shaped areas which run the whole vertical length of screen as indicated in Fig. 2; the frustrum shaped bodies in Figs. 1 and 2, being exaggerated in size for the purpose of being more easily understood. Such a stereoscopic projection screen with various shaped frustrum bodies being made of any suitable material desired. The projection of images upon such a screen, to be more fully described, being from a point of position as indicated by 1 in Fig. 1.

The frustrum shaped bodies or projections of the screen vary in shape from vertically elongated equilateral or isosceles triangular frustrums in centre of screen and gradually changing in shape on approaching the horizontal margins of screen to right or left vertically elongated triangular frustrums according to horizontal side of centre of screen, and so on, to vertically elongated obtuse-angled triangular frustrums, which are more pronounced as horizontal margins of screen are reached. In other words, the triangular shaped frustrums of the projection screen are of such triangular shaped frustrums that they correspond to the crossing of two lines from two points of about 2½ inches apart, the two points being in distance from each other approximately the same as the normal distance of the crossing of such two lines from the two points being approximately the same as distance of images of scenes or objects in projector to the projection screen, and the approximate distance of the eyes of the observer to the screen, or corresponding to the crossing of the optic axes at distances as above described. The triangular shaped frustrums or projections being such that they are corresponding to the lines of direction which are made by two lines crossing which are not more than the normal distance of two eyes, as 1 and 2 in Fig. 1.

The distance of these two points, 1 and 2, forming the right and left sides of the triangular shaped frustrums.

When a single angle image an ordinary photograph or picture, is properly projected upon such a screen as above described, from position 1 in Fig. 1 in relation to the screen, the left eye being in position 2 and the right eye in position 3 as indicated in Fig. 1, the two eyes being horizontal in relation to the vertical triangular frustrums, such horizontal relation of the eyes to the vertical direction of the frustrums, at any vertical height of the two eyes when viewing such images projected upon such a screen, images of scenes or objects will produce perception of relief, solidity, space, etc., with more or less degree, according to the laws of vision and according to the degree which such law or perception of relief etc., is complied with.

Each eye will be presented with factors that are very much like those met with in binocular vision, or, factors necessary for perception of depth when looking at an actual scene or object with both eyes. Both eyes will see certain portions of picture which will represent corresponding points, as indicated by sections 2 in Fig. 2; the left eye will see the non-corresponding points of picture as indicated by sections marked 1 in Fig. 2, as well as sections 2; the right eye will see the non-corresponding points of picture as indicated by section 3 in Fig. 2 as well as section 2.

By means of such a screen as described, a projection picture upon the screen is divided into a number of sections and each of these sections is again subdivided into three sections each and accordingly as described the left eye will see more of the left side of image and the right eye will see more of the right side of image, while the centre of image will be seen by both eyes, on each section of such a screen; and this is exactly what happens when examining a pair of stereoscopic images or photographs in the stereoscope or in looking at an actual scene in space with both eyes.

I do not confine myself to the particular style of projection screen here shown, but various other changes and modifications, within the skill of those versed in the mentioned arts may be made in such a projection screen as has been shown and described herein without departing from the spirit of my invention provided the principle set forth in the following claim be employed.

Having thus described my invention, I claim:—

A stereoscopic projection screen comprising a flat base arranged vertically and a plurality of elongated bodies disposed vertically upon the outer side of the base and spaced apart, each body in cross-section having opposite sides converging outwardly in intersecting planes radiating from points of vision spaced outwardly from the base and spaced a binocular distance apart, each body having a flat outer face lying between said intersecting planes and between the point of intersection thereof and said base.

This specification signed and witnessed this 20th day of January, 1922.

CHARLES BOUIN.

Witnesses:
MAY R. McEVOY,
MARGARET PEABODY.